Dec. 12, 1961  A. J. BOBULA  3,013,167
ELECTRIC MOTOR SHAFT POSITIONING MEANS
Filed May 5, 1958

INVENTOR.
ALEX J. BOBULA
BY Hudson, Boughton,
Williams, David & Hoffmann
ATTORNEYS United States Patent Office 3,013,167
Patented Dec. 12, 1961

3,013,167
ELECTRIC MOTOR SHAFT POSITIONING MEANS
Alex J. Bobula, Olmsted Falls, Ohio, assignor to The Leece-Neville Company, Cleveland, Ohio, a corporation of Ohio
Filed May 5, 1958, Ser. No. 732,913
8 Claims. (Cl. 310—90)

This invention relates to electrical machines of the kind having a rotor or armature and, more particularly, to a novel construction by which the rotor shaft or armature shaft of such a machine can be accurately positioned axially of the machine.

In electric motors built for certain uses, the housing of the motor has a locating portion or surface engageable with a support or the like on which the motor is to be mounted, and the armature shaft has a drive portion which includes an abutment element or shoulder. In these particular motors, the dimensional distance between the locating surface of the housing and the abutment element of the shaft is required to be accurately held to a given value for the attainment of certain important advantages in connection with the uses to which the motors are to be put. If the motors are of a conventional form and are to be produced in accordance with conventional manufacturing procedures for quantity production, this desired dimensional distance cannot be accurately maintained.

The present invention deals successfully with this problem by providing a novel construction for an electric motor or the like wherein holding means, adapted to be assembled on the armature shaft in a co-operating thrust relation to one of the shaft bearings, positions the shaft axially in the housing so as to locate a drive portion of the shaft at a desired accurately spaced distance from a mounting surface or portion of the motor housing.

This invention also has other advantages including that of achieving quieter operation due to a reduction in vibration and chatter, and which quieter operation is very important, particularly in small motors intended for use in heating and air conditioning systems of motor vehicles.

This invention also provides such novel shaft positioning means in combination with an armature shaft or the like which is rotatably supported by self-aligning bearings.

Additionally, this invention provides novel shaft positioning means in combination with an armature shaft or the like which is rotatably supported by self-lubricating bearings and wherein a portion of the positioning means acts as a lubricant guard, preferably a lubricant slinger, for excluding lubricant from electrically conducting portions of the motor.

Figure 1:
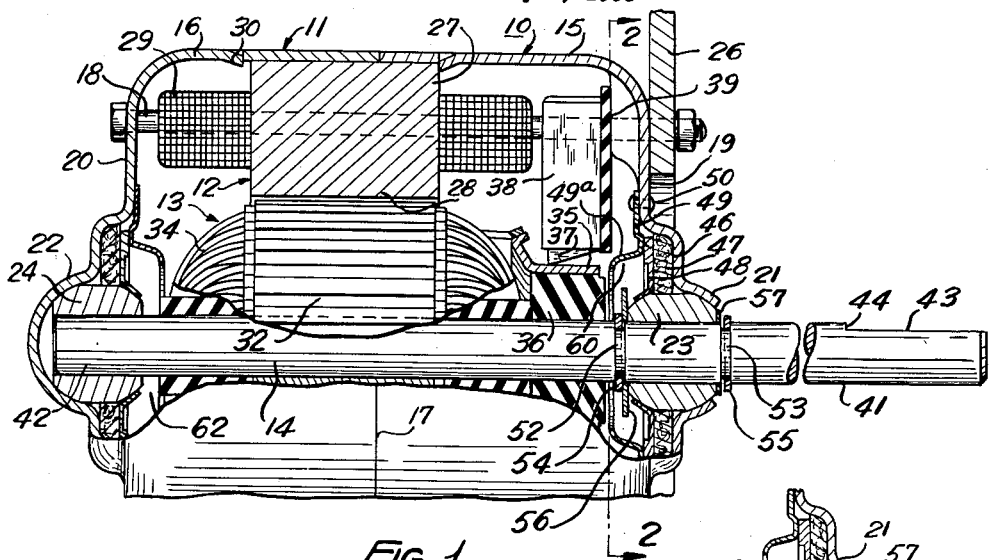
Figure 3:
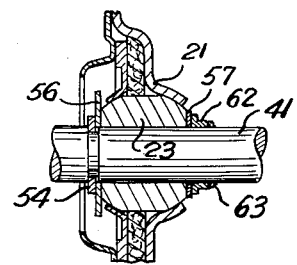
Figure 2:
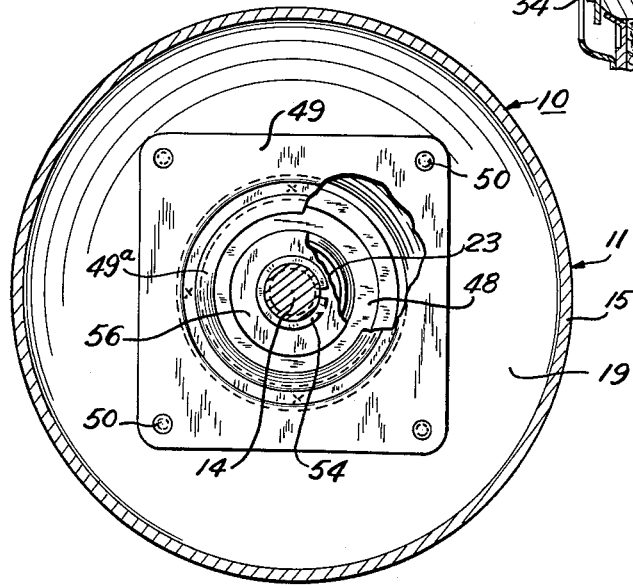

Other objects and advantages of this invention will be apparent in the following detailed description and in the accompanying drawing forming a part of this specification and in which, FIG. 1 is a partial axial section taken through an electrical machine or motor embodying the present invention;

FIG. 2 is a transverse section taken through the machine or motor on section line 2—2 of FIG. 1; and FIG. 3 is a partial transverse section corresponding with a portion of FIG. 2 and showing a modified form of the invention.

As one embodiment thereof, the accompanying drawing shows the present invention applied to an electric motor 10 which is of a type and construction adapted to be produced in quantities and to be used for driving auxiliary devices of motor vehicles, including the air impellers of vehicle heating and air conditioning equipment where quietness of operation is extremely important. Although the motor 10 is disclosed herein as being suitable for driving auxiliary devices of motor vehicles, the invention is not limited in this respect and is also applicable to electrical machines and motors intended for various other uses.

The motor 10 comprises, in general, a housing 11 having a field structure 12 therein, and an armature 13 located in the housing and rotatable within the field structure 12. The armature 13 includes a shaft 14 which is accurately positioned axially of the housing 11 by the locating means provided by this invention and described hereinafter.

The housing 11 comprises a pair of cup-shaped complemental members 15 and 16 having their adjacent open ends in cooperating engagement on a transverse parting plane 17. The housing members are held in such a coaxially aligned relation by suitable connecting bolts or rods 18. The housing members 15 and 16 have substantially flat radial end portions or walls 19 and 20 which carry bearing seats 21 and 22. The bearing seats 21 and 22 are engaged by bearings 23 and 24 which rotatably support the armature 13 and which will be further described hereinafter.

The end portion of one of the housing members, in this instance the end portion 19 of the housing member 15, forms a locating surface or mounting portion which is engageable with a bracket 26 or the like on which the motor 10 is to be mounted. The locating surface of the end portion 19 is here shown as lying against the adjacent face of the bracket 26 and the motor 10 is attached to the bracket as by one of the connecting bolts 18 of the motor housing.

The field structure 12 is of a conventional form and comprises a laminated body 27 made of magnetic material and having pole portions 28 thereon, and field coils 29 mounted on the body 27 in co-operative association with the pole portions. The laminated body 27 is of a size to be suitably positioned in the housing 11 between groups of locating lugs 30 formed by inwardly deflected portions of the housing members 15 and 16.

The armature 30 is of a conventional construction comprising a laminated rotor body 32 mounted on the shaft 14, and an armature winding 34. The rotor body 32 is provided with suitable slots in which the coils of the winding 34 are located.

The armature 13 also comprises a commutator 35, mounted on the shaft 14 by means of an insulating commutator body 36, and having commutator segments with which the coils of the armature winding 34 are suitably connected. Brushes 37 in co-operative engagement with the commutator 35 are movable in suitable brush holders 38 which are provided in the housing section 15 and attached to the latter by means of an insulating carrier 39.

The armature shaft 14 is provided with end portions 41 and 42 which are rotatably supported in the bearings 23 and 24. The shaft portion 41 extends through and beyond the bearing 23 and is provided with a driving portion which is here shown as comprising a flat 43 and an abutment element or shoulder 44. In the motor 10, the dimensional location of the shoulder 44 relative to the locating surface 19 of the housing 11 is extremely imporatnt and is maintained at a predetermined value by the positioning means of the present invention, and which positioning means is effective to provide such accurate positioning notwithstanding the fact that the motor 10 is otherwise of a conventional form adapted to be produced in quantities by conventional manufacturing and assembly procedures.

The bearing seats 21 and 22 of the housing members 15 and 16 are here shown as being concave annular portions of the end walls 19 and 20 and the bearings 23 and 24 are here shown as being self-aligning bearings in rockable engagement with the bearing seats. The walls 19 and 20 are also provided with annular recesses 46 in a radially surrounding relation to the bearings 23 and 24 and which accommodate lubricant-impregnated fibrous washers 47 for feeding lubricant to the bearings. The bearings 23 and 24 are normally pressed against the bearing seats 21 and 22 by annular spring members 48 lying adjacent the lubricant-impregnated washers 47 and held in place or carried by retainer members 49 which are secured against the end walls 19 and 20 of the motor housing as by means of rivets 50.

In accordance with the present invention one of the projecting portions of the armature shaft 14, in this case the shaft portion 41, is provided with holding means or collar elements located on opposite sides of the bearing 23 for thrust cooperation with the ends of this bearing. For this purpose, the shaft portion 41 is shown as having spaced annular grooves 52 and 53 therein and the shaft positioning means, holding means, or collar elements are engaged in the grooves for thrust co-operation with opposite ends of the bearing 23.

The holding means just referred to is shown in FIG. 1 as comprising snap rings 54 and 55 engaged in the grooves 52 and 53, and thrust washers 56 and 57 maintained in adjacent relation to the ends of the bearing 23 by the respective snap rings 54 and 55. If desired, the snap rings 54 and 55 can serve as thrust washers also, but use of separate thrust washers in addition to the snap rings is preferred because these washers present an unbroken thrust surface to the ends of the bearing 23.

The retainer member 49 associated with the bearing 23 is shaped so that the inner radial flange portion 49a thereof forms an annular lubricant-collecting groove or recess 60 lying substantially opposite the thrust washer 56. The thrust washer 56 is preferably made of a diameter such that its peripheral edge extends radially from the shaft 14 for a sufficient distance to enable this washer to serve as a barrier means for preventing migration of lubricant from the bearing 23 into contaminating engagement with electrically conducting portions of the motor. The thrust washer 56 is located opposite the collecting groove 60 so that excess lubricant encountering this washer will be directed thereby into the collecting groove either by drippage or by a slinging action.

From the construction and arrangement of the shaft positioning means just described above, it will be seen that the snap rings 54 and 55 and the thrust washers 56 and 57 will be in co-operative holding engagement with the opposite ends of the bearing 23 and will thus act to accurately position the shaft 14 axially in the motor housing 11. Because of this accurate positioning of the shaft 14, the drive portion 43 thereof, and particularly the abutment element 44, will be located at a substantially exact dimensional distance from the locating surface or end wall 19 of the motor housing. It will also be seen that the grooves 52 and 53 can be readily provided on the shaft 14 in a desired accurate dimensional relation to the abutment element 44 and that the snap rings and thrust washers 54, 55 and 56, 57 can be readily assembled on the shaft in the above-explained co-operative relation to the ends of the bearing 23.

When the shaft portion 41 is thus held by the positioning co-operation of the snap rings and thrust washers with the bearing 23, the shaft portion 42 is left free to float or shift axially in the bearing 24. The portions of the armature adjacent the bearing 24 are separated therefrom by the intervening annular space 62 which is left open, instead of being filled with thrust washers as has been done heretofore, so that vibration noises and chattering which has heretofore been prone to develop at the location of such thrust washers has been successfully eliminated.

FIG. 3 of the drawing shows a modified form of the shaft positioning means and wherein the holding means co-operating with the outer end of of the bearing 23 comprises the thrust washer 57 and a collar element 62 fixed on the shaft portion 41. The collar element 62 can be a ring-shaped member or ferrule which has been pushed onto the shaft 14 and which is fixed on the shaft by a shrink fit or self-gripping action on the peripheral surface of the shaft portion 41, or if desired, by a fused junction 63 formed by solder or the like. When the collar element 62 is of the form shown in FIG. 3, the groove 53 is omitted from the shaft portion 41.

From the accompanying drawings and the foregoing detailed description it will now be readily understood that this invention provides a new and improved construction for an electric motor, or the like, by which an accurate positioning of the shaft of the rotor or armature is obtainable in a simple and efficient manner and without greatly increasing the cost of manufacture of the machine. It will now also be understood that the positioning means provided by this invention for the shaft of the machine also results in the achievement of other important advantages including that of a smoother and quieter operation of the motor and more effective barrier means for excluding lubricant from the interior of the machine. Still another advantage is that the holding means facilitates disassembly of the motor when that becomes necessary because the holding means retains the armature and commutator in assembly with the housing member 15 so that the brushes 37 cannot become dislodged from their holders 38 or from the commutator.

Although the novel electrical machine and shaft positioning means of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In an electric motor or the like, a divided housing having separable end portions, a field structure in said housing including pole portions and field coils, an armature including a shaft, bearings mounted on said end portions and rotatably supporting said armature at opposite ends thereof with portions of said shaft extending through said bearings, one of said shaft portions having grooves therein at opposite ends of the bearing associated with said one shaft portion, and shaft positioning means only on said one shaft portion for axially positioning said shaft comprising positioning members mounted on said one shaft portion by engagement in said grooves and being in a co-operating thrust relation to the ends of said associated bearing.

2. A motor or the like as defined in claim 1 and wherein said positioning members comprise snap rings having self-locking engagement in said grooves.

3. A motor or the like as defined in claim 1 and wherein said positioning members comprise snap rings having self-locking engagement in said grooves and thrust washers confined in a thrust co-operative relation to the ends of said associated bearing by said snap rings.

4. A motor or the like as defined in claim 1 and wherein said end portions have concave annular bearing seats thereon and said bearings are self-aligning bearings in rockable engagement with said seats, and wherein said positioning members comprise snap rings having self-locking engagement in said grooves.

5. In an electric motor or the like, a divided housing having separable end portions and a mounting face, a field structure in said housing including pole portions and field coils, an armature including a shaft, bearings mounted on said end portions and rotatably supporting said armature at opposite ends thereof with portions of said shaft extending through said bearings, one of said shaft portions having a drive portion thereon including an abutment element located at a predetermined dimensional distance from said mounting face, and shaft positioning means on said one shaft portion only and axially positioning said shaft for maintaining said dimensional distance comprising spaced collar elements on said one shaft portion and being in a co-operating thrust relation to the ends of the bearing associated with said one shaft portion, the other of said shaft portions being free of shaft positioning means for axially positioning said shaft.

6. An electric motor or the like as defined in claim 5 and wherein said end portions have concave annular bearing seats thereon and said bearings are self-aligning bearings in rockable engagement with said seats, and wherein said one shaft portion has grooves therein and said collar elements comprise snap rings having a self-locking engagement in said grooves.

7. In an electric motor or the like, a divided housing having separable end portions, a field structure in said housing, an armature including shaft projections, bearings mounted on said end portions for rotatably supporting said armature at opposite ends thereof and having said shaft projections engaged therein, one of said shaft projections having a groove therein adjacent the inner end of the bearing associated with said one shaft projection, means on the end portion which supports the last-mentioned bearing and defining an annular lubricant collecting recess, and shaft positioning means on said one shaft portion only for axially positioning said shaft comprising spaced collar means on said one shaft projection and located in thrust co-operative relation to the ends of said associated bearing, the collar means at the inner end of said associated bearing comprising a snap ring engaged in said groove and a thrust washer lying between said snap ring and said inner end, said thrust washer being opposite said recess and effective as a barrier means for directing lubricant into said recess.

8. In an electric motor or the like, a housing, a field structure in said housing, an armature rotatable relative to said field structure and including shaft projections, said housing comprising connected housing sections having end walls extending transversely of the rotation axis of the armature, bearings on said end walls for rotatably supporting the armature at opposite ends thereof and having said shaft projections received therein, said armature having a commutator adjacent one of said end walls, brush rigging adjacent said one end wall and including brushes cooperating with said commutator, and retaining means for said armature comprising axially spaced annular shoulders on one only of said shaft projections and cooperating with the ends of the bearing of said one end wall, the cooperation of said retaining means with said one bearing being effective to retain said armature in a connected relation with the associated housing member upon disassembly of the motor, said one shaft projection having an annular groove therein adjacent said one bearing and the retaining means at one end of said one bearing comprising ring means engaged in said groove.

References Cited in the file of this patent

UNITED STATES PATENTS

| | | |
|---|---|---|
| 1,328,064 | Vasselli | Jan. 13, 1920 |
| 1,896,972 | Redmond | Feb. 7, 1933 |
| 1,987,178 | Brown | Jan. 8, 1935 |
| 2,483,013 | Kopprasch | Sept. 27, 1949 |
| 2,522,985 | Bradley | Sept. 19, 1950 |
| 2,740,058 | Schaefer | Mar. 27, 1956 |

FOREIGN PATENTS

| | | |
|---|---|---|
| 496,201 | Canada | Sept. 15, 1953 |

OTHER REFERENCES

Publication "Product Engineering," "Why Stamped Retaining Rings," February 1950, pp. 124–128.